United States Patent
Xu

(10) Patent No.: US 10,048,574 B2
(45) Date of Patent: Aug. 14, 2018

(54) ELECTRONIC DEVICE

(71) Applicant: Lenovo (Beijing) Limited, Beijing (CN)

(72) Inventor: Yulong Xu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 181 days.

(21) Appl. No.: 15/085,595

(22) Filed: Mar. 30, 2016

(65) Prior Publication Data

US 2017/0184948 A1 Jun. 29, 2017

(30) Foreign Application Priority Data

Dec. 28, 2015 (CN) .......................... 2015 1 1000584
Dec. 28, 2015 (CN) .......................... 2015 1 1000826

(51) Int. Cl.
*G03B 21/14* (2006.01)
*H04N 9/31* (2006.01)
*F16M 11/04* (2006.01)
*G03B 21/132* (2006.01)

(52) U.S. Cl.
CPC ......... *G03B 21/142* (2013.01); *G03B 21/132* (2013.01); *G03B 21/145* (2013.01); *F16M 11/04* (2013.01); *H04N 9/3141* (2013.01)

(58) Field of Classification Search
CPC .... G03B 21/145; G03B 21/14; G03B 21/142; G03B 21/132; H04N 9/3141; F16M 11/02; F16M 11/04
USPC ........................................................ 353/119
See application file for complete search history.

(56) References Cited

U.S. PATENT DOCUMENTS

| | | | | |
|---|---|---|---|---|
| 2007/0146653 A1* | 6/2007 | Sukenari | ................ | G03B 21/00 353/120 |
| 2007/0247599 A1* | 10/2007 | Kadowaki | .............. | F16M 11/28 353/101 |
| 2008/0198338 A1 | 8/2008 | Yokote et al. | | |
| 2010/0265475 A1* | 10/2010 | Jeon | ......................... | G03B 3/00 353/101 |
| 2012/0262682 A1* | 10/2012 | Chuang | ............... | F21V 33/0048 353/119 |

FOREIGN PATENT DOCUMENTS

| | | |
|---|---|---|
| CN | 2593231 Y | 12/2003 |
| CN | 1740902 A | 3/2006 |
| CN | 102072382 A | 5/2011 |
| CN | 203204287 U | 9/2013 |
| CN | 203405666 U | 1/2014 |
| CN | 104766499 Y | 7/2015 |
| JP | 2008076582 A | 4/2008 |
| JP | 2015007689 A | 1/2015 |

* cited by examiner

*Primary Examiner* — Ryan Howard
(74) *Attorney, Agent, or Firm* — Ference & Associates LLC

(57) ABSTRACT

An embodiment provides an electronic device, including: a support arm; a base portion connected to one end of the support arm; a head portion connected to the other end of the support arm; a projector disposed within the head portion; and a projector adjustment element that adjusts an image projected by the projector; wherein a portion of the projector adjustment element is exposed on an underside of the head portion. Other embodiments are described and claimed.

18 Claims, 23 Drawing Sheets

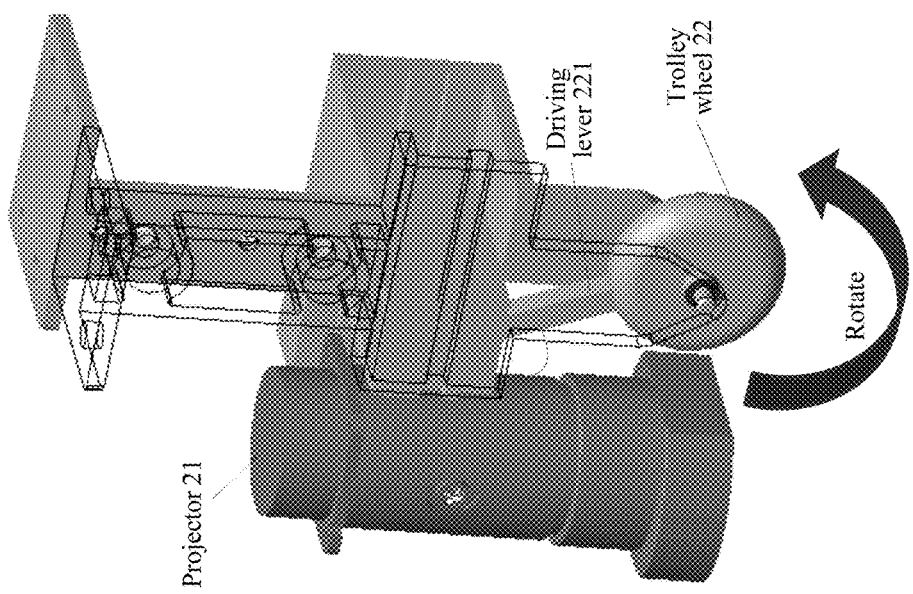

ELECTRONIC DEVICE

CLAIM FOR PRIORITY

This application claims priority to Chinese Application Nos. 201511000826.9 and 201511000584.3, each filed on Dec. 28, 2015, the contents of which are fully incorporated by reference herein.

TECHNICAL FIELD

The present disclosure relates to the field of terminal devices, and in particular, relates to an electronic device.

BACKGROUND

With the development of the electronic technologies, projectors are more and more widely applied. To be specific, the projectors have been extensively used in such fields as households, offices, schools, recreation places.

At present, a projector may be mounted in a plurality of mounting manners, for example, placing the projector on a desk, hoisting the projector, mounting the projector by using a bracket, or the like. However, under some circumstances, for example, hoisting the projector, when the projector needs to be mounted at a high position, it is inconvenient to adjust the projector. For example, it is inconvenient to adjust the projector mounted against the ceiling in a classroom.

Furthermore, current projectors are relatively monotonous in shape, structure, and function.

BRIEF SUMMARY

In summary, one aspect provides an electronic device, comprising: a support arm; a base portion connected to one end of the support arm; and a head portion connected to the other end of the support arm, wherein the head portion comprises: a projector fixed to the head portion via a projector bracket and that makes a projection to a first region in a plane where the base portion is disposed; and a trolley wheel connected to the projector that adjusts an image projected by the projector; wherein a first portion of the trolley wheel is exposed on a first outer surface of an outer casing of the head portion.

Another aspect provides an electronic device, comprising: a support arm; a base portion connected to one end of the support arm; and a head portion connected to the other end of the support arm; wherein: the base portion and the head portion are both provided therein with accommodation space for parts; the head portion comprises a projector assembly that at least projects to a first area of a plane on which the base portion is positioned; and the base portion comprises a counterweight so that a height of a center of the gravity of the electronic device is lower than a preset height.

A further aspect provides an electronic device, comprising: a support arm; a base portion connected to one end of the support arm; a head portion connected to the other end of the support arm; a projector disposed within the head portion; and a projector adjustment element that adjusts an image projected by the projector; wherein a portion of the projector adjustment element is exposed on an underside of the head portion.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
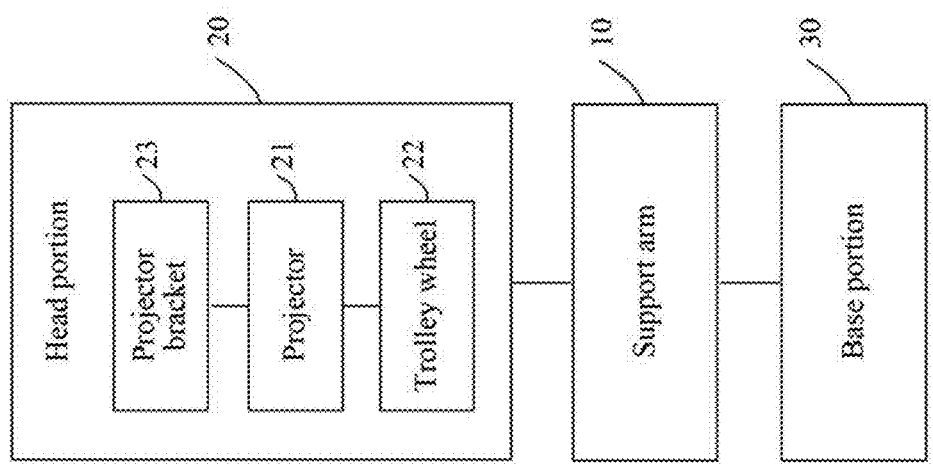
FIG. 1 is a schematic structural diagram of an electronic device according to an embodiment.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

An embodiment provides an electronic device to at least address the inconvenience of adjusting a projector in the related art and to improve user experience.

An embodiment provides an electronic device, comprising: a support arm, a base portion connected to one end of the support arm, and a head portion connected to the other end of the support arm; wherein the head portion comprises: a projector, which is fixed to the head portion via a projector bracket and is at least configured to make a projection to a first region in a plane where the base portion is disposed; and a trolley wheel, which is connected to the projector and is configured to adjust an image projected by the projector; wherein a first portion of the trolley wheel is exposed on a first outer surface of an outer casing of the head portion.

In an embodiment the head portion further comprises: a sliding block, of which one end is connected to a knob extension rod and the other end is connected to the trolley wheel, and which is capable of sliding along a fixing bracket; and a knob extension rod, of which one end is connected to the sliding block and the other end is connected to a knob of the projector; wherein, correspondingly, the trolley wheel is connected to the projector via the sliding block.

In an embodiment the sliding block is connected to the trolley wheel via a driving lever arranged on an upper end of the trolley wheel; and the knob extension rod is connected to the knob of the projector in a sleeve manner.

In an embodiment the fixing bracket comprises a first fixing bracket and a second fixing bracket; wherein the first fixing bracket and the second fixing bracket are locked to each other via a first fastener, such that the sliding block and the trolley wheel are both sandwiched between the first fixing bracket and the second fixing bracket.

In an embodiment the first fixing bracket and the second fixing bracket are fixed to the outer casing of the head portion via a second fastener.

In an embodiment the first fixing bracket and the second fixing bracket are each provided with a first mating member; the sliding block is provided with two second mating members matching with the first mating members; and when the sliding block slides, the two second mating members are capable of moving along the first mating members arranged on the first fixing bracket and the second fixing bracket.

In an embodiment the first mating member is a groove, and the second mating member is a protrusion.

In an embodiment, when rotating, the trolley wheel drives the driving lever to move, the driving lever drives the sliding block to slide along the first fixing bracket and the second fixing bracket, and the sliding of the sliding block drives the knob of the projector, thereby adjusting the clarity of the image projected by the projector.

In an embodiment a first portion of a lens of the projector is exposed on the first outer surface of the outer casing of the head portion, such that the projector makes a projection towards the plane where the base portion is disposed.

In an embodiment, on the first outer surface of the outer casing of the head portion, the first portion of the lens of the projector is adjacent to the first portion of the trolley wheel, with a spacing between the first portion of the lens and the first portion of the trolley wheel being less than a preset threshold.

In an embodiment the trolley wheel is of a circular shape.

In an embodiment the support arm, the base portion, and the head portion are accommodated in an outer casing having an integral structure.

In an embodiment the integral structure is of a moon-like door shape.

With an embodiment, the sliding block is driven by the rotation of the trolley wheel, and the sliding of the sliding block drives the knob of the projector to turn about to adjust the clarity of the image projected by the projector, wherein the first portion of the trolley wheel is exposed on the first outer surface of the outer casing of the head portion. In this way, the problem that it is inconvenient to adjust a projector in the related art can be at least addressed, and user experience is improved.

In an embodiment the head portion, which comprises a projector assembly, can at least project to a first area of a plane on which the base portion is positioned; and the base portion comprises a counterweight so that a height of a center of gravity of the electronic device can be below a preset height.

In an embodiment the support arm comprises: a controllable light bar that, when the electronic device is in a first operation mode, can illuminate a first side of the support arm when illuminated.

In an embodiment various parts are connected in linear array in the first accommodation space of the head portion; and various parts are connected in linear array in the second accommodation space of the base portion.

In an embodiment the projector assembly comprises a projector, a projector holder and a focal length adjustment component; wherein, the projector holder is fixed on the first housing of the head portion and the projector is mounted on the projector holder for projecting images; the focal length adjustment component is used for adjusting the images projected.

In an embodiment the projector assembly further comprises: a primary fan for the projector located on one side of the projector and adjacent to the drive board for projector cooling; and a secondary fan for the projector located right above the projector for increasing wind flow for the projector.

In an embodiment the head portion further comprises: a pluggable camera assembly for collecting operation data and sending the operation data collected to the mainboard of the base portion; a drive board connected to the projector; the drive board being mounted on the drive board holder fixed on the first housing of the head portion; and an adapter board of the drive board for connecting the drive board and mainboard located on the base portion.

In an embodiment the base portion further comprises: a mainboard holder fixed on the second housing of the base portion; and a mainboard mounted on the mainboard holder and connected to the drive board on the head portion through the adapter board of the drive board on the head portion.

In an embodiment the mainboard is used for providing projection control for the electronic device based on operation data collected by the camera assembly. In an embodiment the mainboard is also used for: providing a computer function for the electronic device and projecting first information in the computer to a first area on the plane of the base portion via the projector and displaying the first information on the first area.

In an embodiment the base portion further comprises: a mainboard fan located on one side of the mainboard for mainboard cooling; and a top fan located on the top of the mainboard for increasing wind flow for the mainboard.

In an embodiment the base portion further comprises: a battery holder fixed on the second housing of the base portion; a battery mounted on the battery holder on the other side of the mainboard for power storage or supply; and a switch connected to the mainboard, the first part of the switch being located on an exterior of the second housing for turning on and off the electronic device.

In an embodiment the housing for the support arm, the base portion, and the head portion is an integrated structure, wherein, the housing is made of an alloy.

In an embodiment the inner housing for the support arm and/or the head portion is a transparent member so that light can pass through the transparent member when the light bar in the support arm is illuminated.

In an aspect embodiment the transparent member is made of acrylic or polycarbonate (PC for short).

These technical aspects utilize the structural features of the electronic device itself to accomplish a steadier center of gravity for the device. The device also supports multiple functions which are convenient for adjusting the projection functions so as to improve user experience.

For better and detailed understanding of the features and technical content, example embodiments are illustrated in detail with reference to the accompanying drawings. The accompanying drawings are merely for illustration and reference, but are not intended to limit the scope of the claims.

Embodiment 1

An embodiment provides an electronic device. FIG. 1 is a schematic structural diagram of an electronic device according to an embodiment. The electronic device comprises: a support arm 10, a base portion 30 connected to one end of the support arm 10, and a head portion 20 connected to the other end of the support arm 10. As illustrated in FIG. 1, the head portion 20 comprises: a projector 21, which is fixed to the head portion 20 via a projector bracket 23 and is at least configured to make a projection to a first region in a plane where the base portion 30 is disposed; and a trolley wheel 22, which is connected to the projector 21 and is configured to adjust an image projected by the projector 21.

Herein, the adjustment of the image projected by the projector 21 mainly refers to adjustment of clarity of the image. The projector bracket 23 may be fixed to an outer casing of the head portion 20 via a fastener. The fastener may be, for example, a screw and nut, a screw, a bolt, a stud, a rivet, and the like.

A first portion of the trolley wheel 22 is exposed on a first outer surface of the outer casing of the head portion 20. As such, it is convenient for a user to prod the trolley wheel. When the projection function of the electronic device is enabled, if the image projected by the projector is not clear, the trolley wheel needs to be adjusted. To be specific, the user may prod the trolley wheel using his or her hands, and may stop prodding the trolley wheel when the image becomes clear.

Herein, the first outer surface refers to an outer surface oriented towards the plane where the base portion 30 is disposed. Correspondingly, the second outer surface refers to an outer surface going against the plane where the base portion 30 is disposed.

In an embodiment the trolley wheel 22 is of a circular shape. The support arm 10, the base portion 30, and the head portion 20 are accommodated in an outer casing having an integral structure. For example, the integral structure may be of a moon-like door shape, a sickle shape, a desk lamp shape, or the like.

Figure 2:
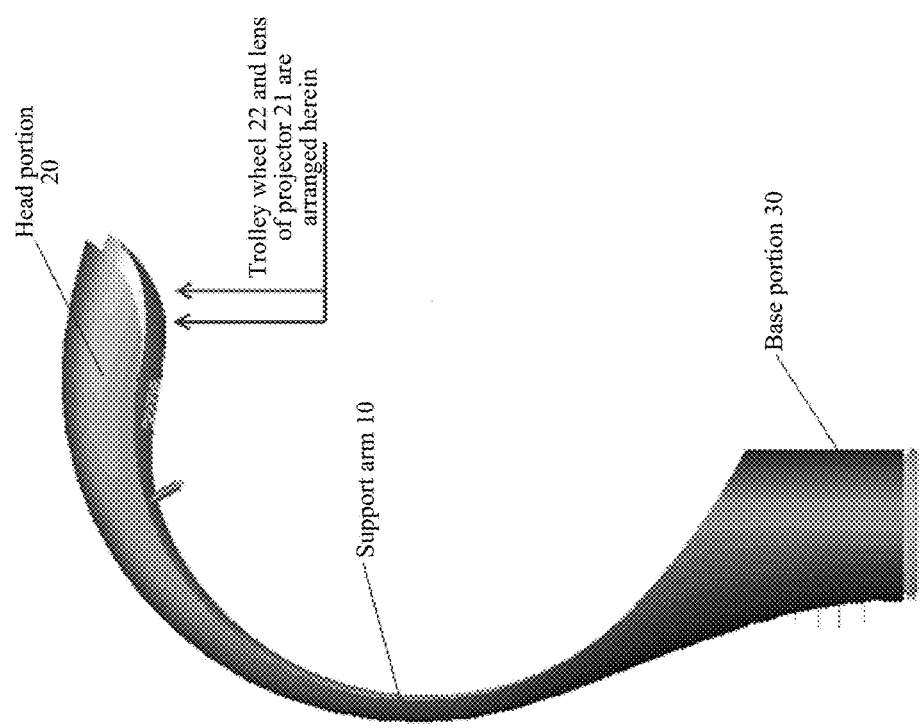
FIG. 2 is an overall schematic effect diagram of an electronic device according to an embodiment.

FIG. 2 is an overall schematic effect diagram of an electronic device according to an embodiment. As illustrated in FIG. 2, the electronic device is integrally of a moon-like door structure. A first portion of a lens of the projector 21 is exposed on the first outer surface of the outer casing of the head portion, such that the projector 21 makes a projection towards the plane where the base portion 30 is disposed.

On the first outer surface of the outer casing of the head portion 20, the first portion of the lens of the projector 21 is adjacent to a first portion of the trolley wheel 22, with a spacing between the first portion of the lens and the first portion of the trolley wheel 22 being less than a preset threshold.

Figure 3:
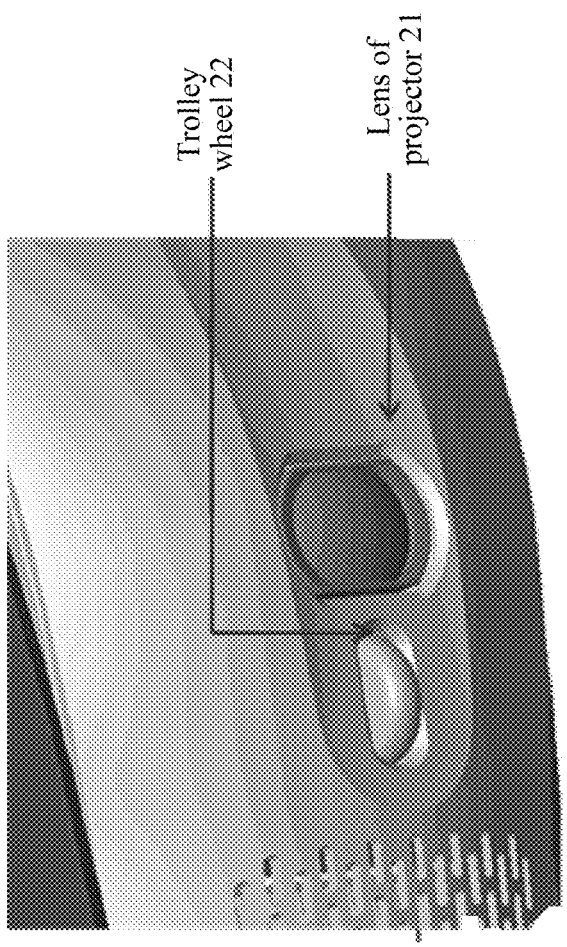
FIG. 3 is a schematic distribution diagram of a projector lens and a first outer surface of an outer casing of a head portion of a trolley wheel according to an embodiment.

FIG. 3 is a schematic distribution diagram of a projector lens and a first outer surface of an outer casing of a head portion of a trolley wheel according to an embodiment. As illustrated in FIG. 3, the first portion of the lens of the projector 21 is adjacent to the first portion of the trolley wheel 22, and the first portion of the lens of the projector 21 and the first portion of the trolley wheel 22 are both exposed on the first outer surface of the outer casing of the head portion 20.

Figure 4:
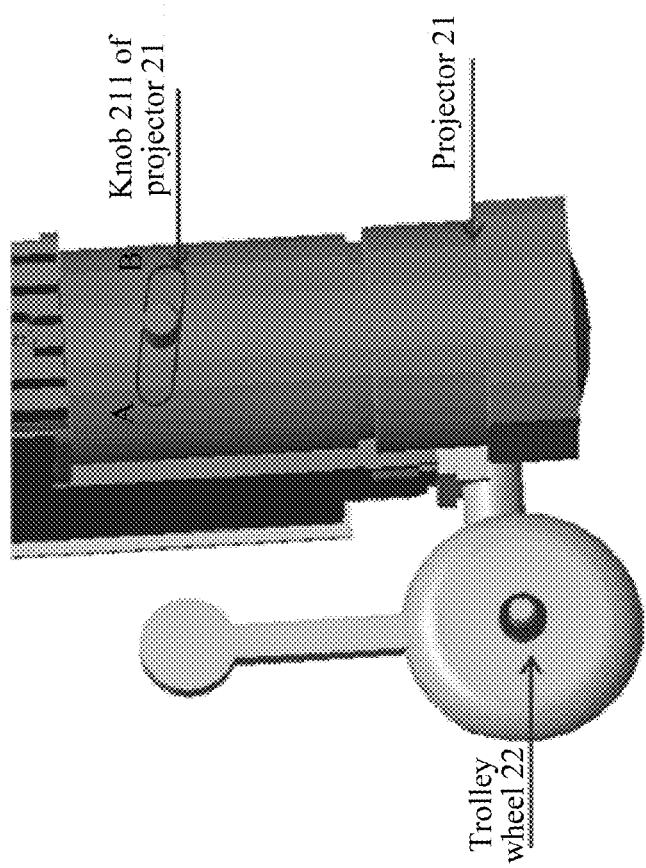
FIG. 4 is a schematic diagram of a relative position relationship between a trolley wheel and a projector according to an embodiment.

FIG. 4 is a schematic diagram of a position relationship between a trolley wheel and a projector according to an embodiment. After the outer casing and the inner casing of the head portion are canceled, as illustrated in FIG. 4, the knob of the projector is arranged on the projector, the knob may move within the range of A to B, the trolley wheel is not directly connected to the projector but is indirectly connected to the projector via other parts. However, the position relationship between the two is adjacency.

In the electronic device according to this embodiment, the first portion of the trolley wheel is exposed on the first outer surface of the outer casing of the head portion. As such, it is convenient for a user to prod the trolley wheel. The trolley wheel drives the knob of the projector to turn about, thereby adjusting the clarity of the image projected by the projector. In this way, the problem that it is inconvenient to adjust a projector in the related art can be at least addressed, and user experience is improved.

Embodiment 2

Figure 5:
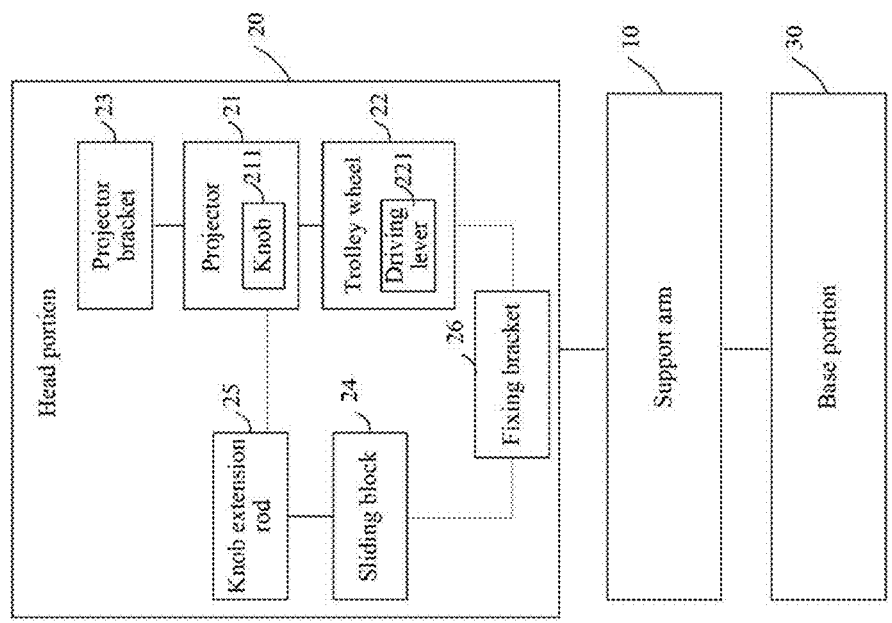
FIG. 5 is a schematic structural diagram of another electronic device according to an embodiment.

FIG. 5 is a schematic structural diagram of another electronic device according to an embodiment. The electronic device comprises: a support arm 10, a base portion 30 connected to one end of the support arm 10, and a head portion 20 connected to the other end of the support arm 10. As illustrated in FIG. 5, the head portion 20 comprises: a projector 21, which is fixed to the head portion 20 via a projector bracket 23 and is at least configured to make a projection to a first region in a plane where the base portion 30 is disposed; and a trolley wheel 22, which is connected to the projector 21 and is configured to adjust an image projected by the projector 21.

The projector bracket 23 may be fixed to an outer casing of the head portion 20 via a fastener. The fastener may be, for example, a screw and nut, a screw, a bolt, a stud, a rivet, and the like. A first portion of the trolley wheel 22 is exposed on a first outer surface of the outer casing of the head portion 20. As such, it is convenient for a user to prod the trolley wheel.

Herein, the first outer surface refers to an outer surface oriented towards the plane where the base portion 30 is disposed. Correspondingly, the second outer surface refers to an outer surface going against the plane where the base portion 30 is disposed.

The head portion 20 further comprises: a sliding block 24, of which one end is connected to a knob extension rod 25 and the other end is connected to the trolley wheel 22, and which is capable of sliding along a fixing bracket 26; and a knob extension rod 25, of which one end is connected to the sliding block 24 and the other end is connected to a knob 211 of the projector 21.

The sliding block 24 is connected to the trolley wheel 22 via a driving lever 221 arranged on an upper end of the trolley wheel 22; and the knob extension rod 25 is connected to the knob of the projector 21 in a sleeve manner. For example, the diameter of the knob extension rod 25 at the end thereof that is connected to the knob 211 of the projector is greater than the diameter of the knob 211 of the projector 21, such that the knob extension rod 25 is connected to the knob 211 of the projector 21 in a sleeve manner.

In the electronic device according to this embodiment, since the trolley wheel is connected to the projector via the sliding block, the trolley wheel, when rotating, drives the driving lever on the trolley wheel to move, and the moving driving lever drives the sliding block to slide along the fixing bracket. The sliding of the sliding block drives the knob of the projector to turn about, to adjust the clarity of the image projected by the projector. In this way, the problem that it is inconvenient to adjust a projector in the related art can be at least addressed, and user experience is improved.

Embodiment 3

Figure 6:
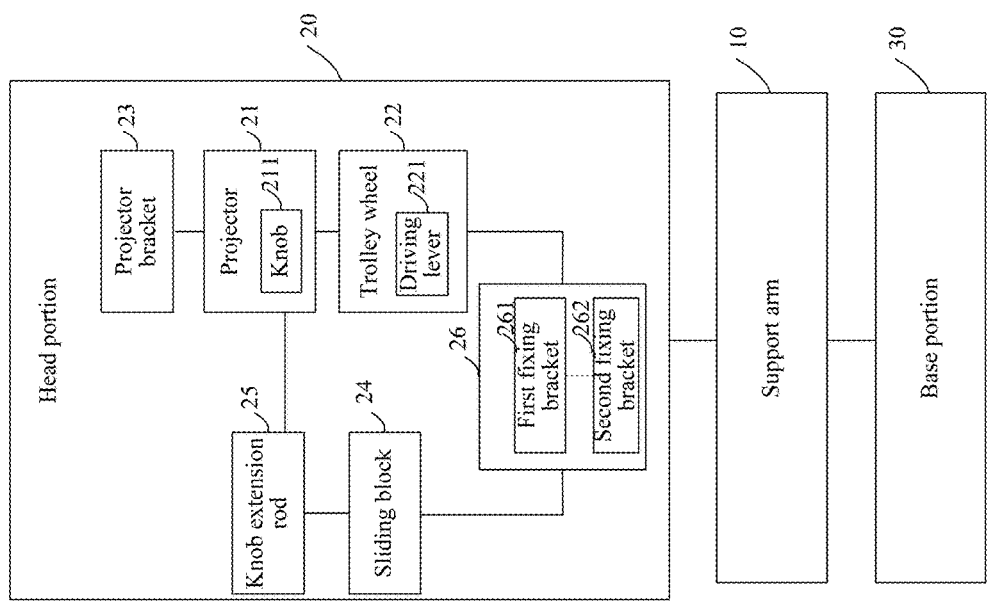
FIG. 6 is a schematic structural diagram of still another electronic device according to an embodiment.

FIG. 6 is a schematic structural diagram of another electronic device according to an embodiment. The electronic device comprises: a support arm 10, a base portion 30 connected to one end of the support arm 10, and a head portion 20 connected to the other end of the support arm 10. As illustrated in FIG. 6, the head portion 20 comprises: a projector 21, which is fixed to the head portion 20 via a projector bracket 23 and is at least configured to make a projection to a first region in a plane where the base portion 30 is disposed; a trolley wheel 22, which is connected to the projector 21 and is configured to adjust an image projected by the projector 21; a sliding block 24, of which one end is connected to a knob extension rod 25 and the other end is connected to the trolley wheel 22, and which is capable of sliding along a fixing bracket 26; and a knob extension rod 25, of which one end is connected to the sliding block 24 and the other end is connected to a knob 211 of the projector 21.

The sliding block 24 is connected to the trolley wheel 22 via a driving lever 221 arranged on an upper end of the trolley wheel 22; and the knob extension rod 25 is connected to the knob of the projector 21 in a sleeve manner.

In an embodiment the fixing bracket 26 comprises a first fixing bracket 261 and a second fixing bracket 262; wherein the first fixing bracket 261 and the second fixing bracket 262 are locked to each other via a first fastener, such that the sliding block 24 and the trolley wheel 22 are both sandwiched between the first fixing bracket 261 and the second fixing bracket 262. Herein, the first fastener may be a bolt and nut, a screw, or the like.

As such, since the fixing bracket 26 is divided into two portions, relative to the fixing bracket 26, the first fixing bracket 261 and the second fixing bracket 262 occupy a small space before being assembled to a finished electronic device, which may be conveniently stored and assembled, thereby saving the assembling time.

In an embodiment the first fixing bracket 261 and the second fixing bracket 262 are fixed to the outer casing of the head portion 20 via a second fastener. Herein, the second fastener may be a screw bolt, a stud, a screw, or the like.

In an embodiment the first fixing bracket 261 and the second fixing bracket 262 are each provided with a first mating member.

The sliding block 24 is provided with two second mating members matching with the first mating members.

When the sliding block 24 slides, the two second mating members are capable of moving along the first mating members arranged on the first fixing bracket 261 and the second fixing bracket 262.

In an embodiment the first mating member is a groove, and the second mating member is a protrusion.

In an embodiment, when rotating, the trolley wheel 22 drives the driving lever 221 to move, the driving lever 221 drives the sliding block 24 to slide along the first fixing bracket 261 and the second fixing bracket 262, and the sliding of the sliding block 24 drives the knob 211 of the projector 21 to turn about, thereby adjusting the clarity of the image projected by the projector 21.

Figure 7:
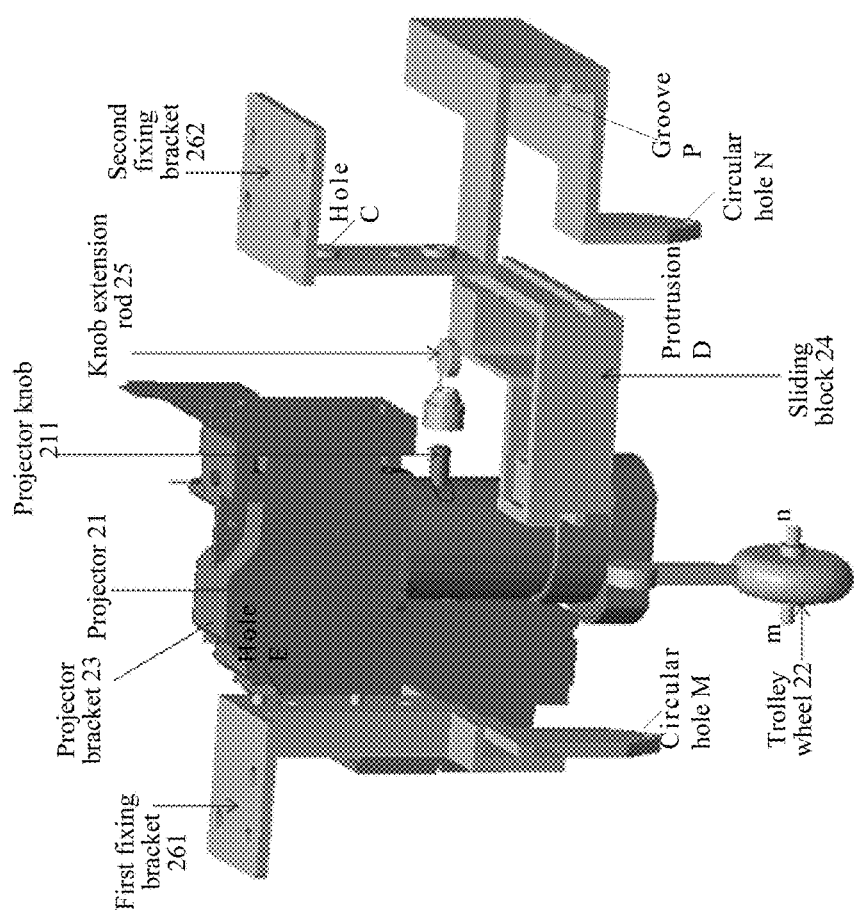
FIG. 7 is a schematic diagram of distribution of various parts of a head portion of the electronic device according to an embodiment.
Figure 8B:
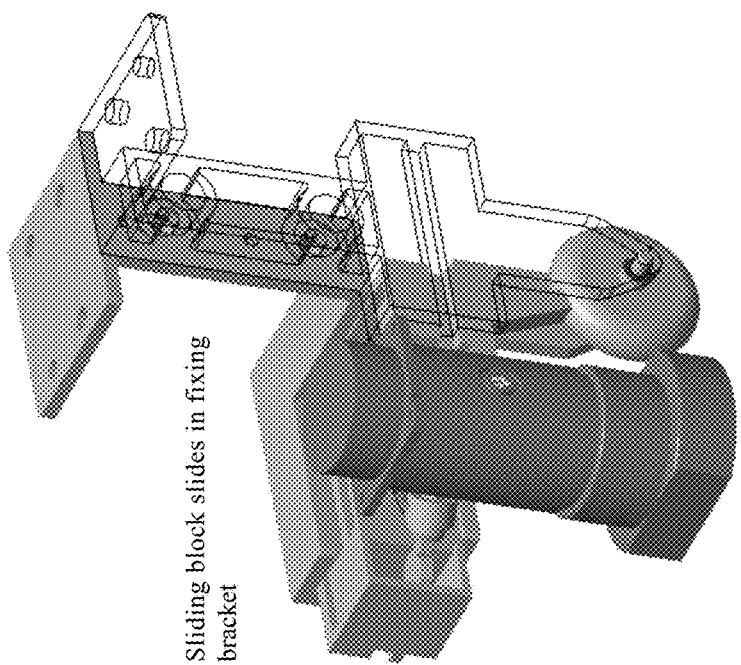
FIG. 8(a-f) is a schematic diagram of a position relationship between various parts of the head portion when the trolley wheel rotates according to an embodiment.
Figure 8C:
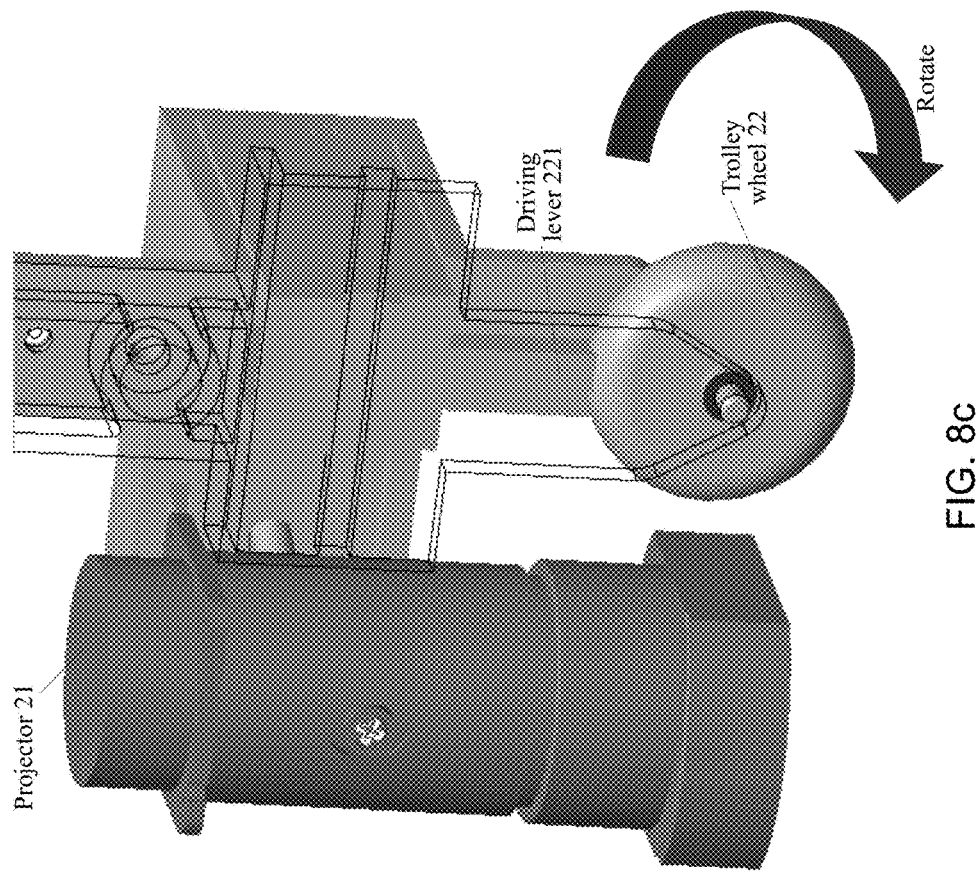
Figure 8D:
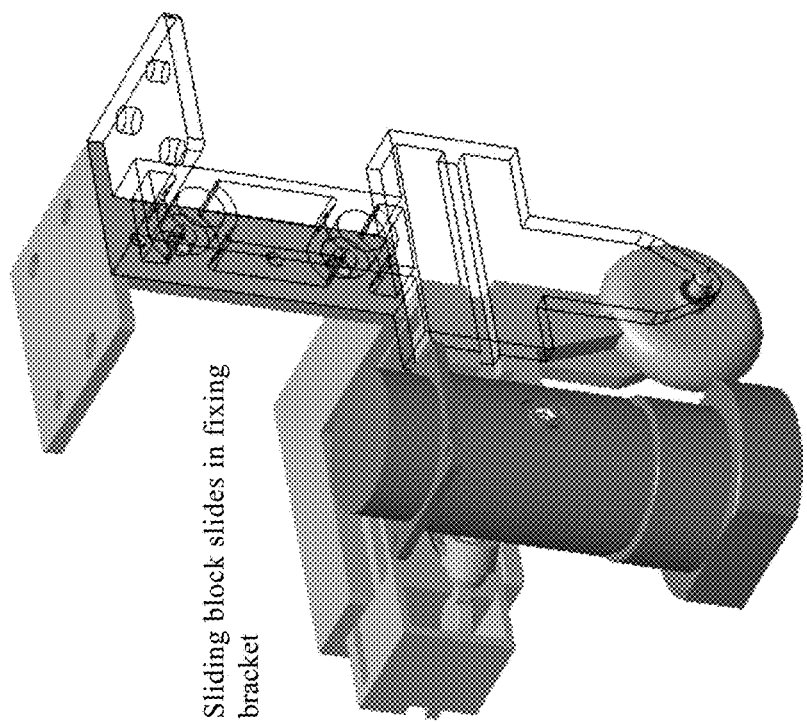
Figure 8E:
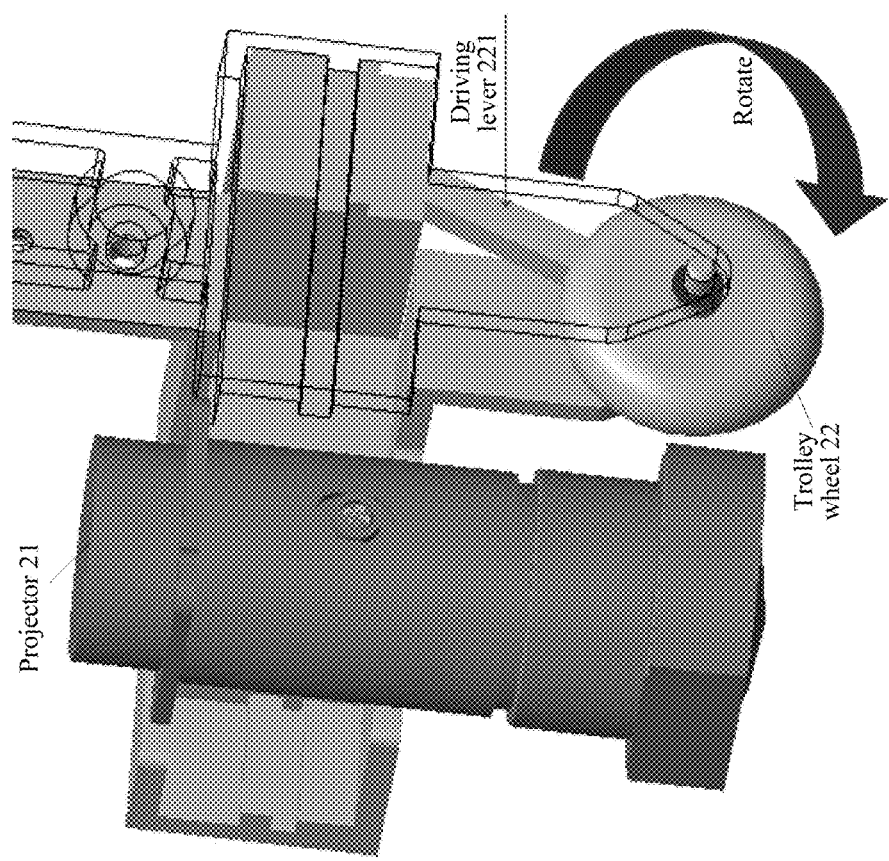
Figure 8F:
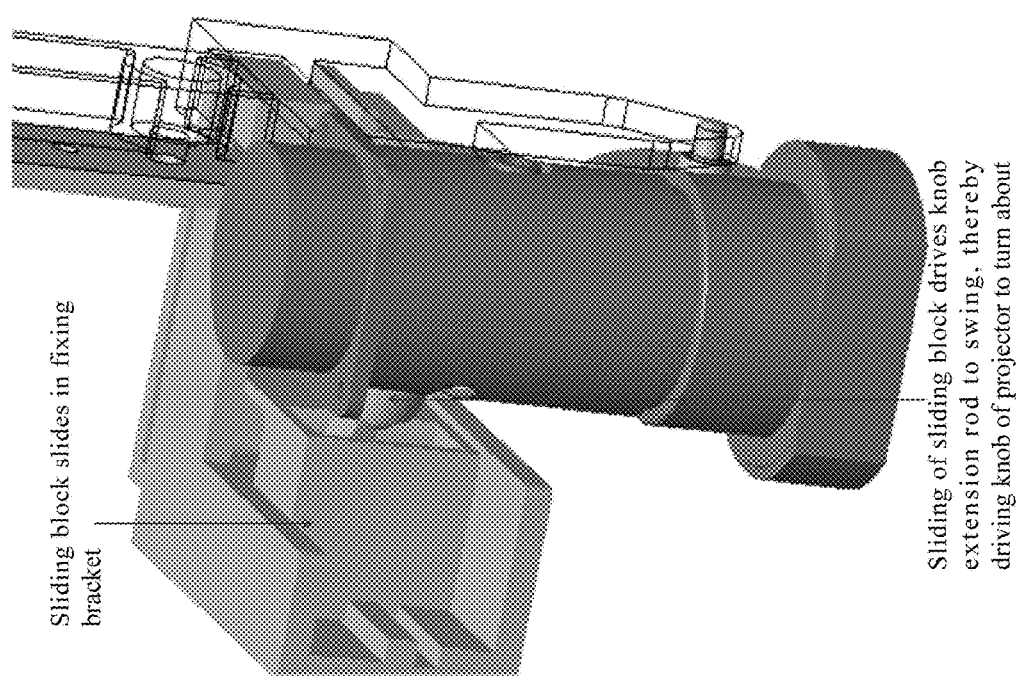

FIG. 7 is a schematic diagram of distribution of various parts of a head portion of the electronic device according to an embodiment. As illustrated in FIG. 7, the projector 21 is fixed via the projector bracket 23, and the projector 21 is provided with the knob 211. One end of the sliding block 24 is connected to the knob extension rod 25. For a better joint to the sliding block 24, the diameter of the knob extension rod 25 is greater than the diameter of the knob 211, such that the knob extension rod 25 is connected to the knob 211 in a sleeve manner. Two ends of the sliding block 24 are both provided with a protrusion D. A protrusion D is capable of matching with grooves P on the first fixing bracket 261 and the second fixing bracket 262, such that the protrusions D are capable of sliding along the grooves P. Upper ends of the first fixing bracket 261 and the second fixing bracket 262 are both provided with a plurality of circular holes, though which the first fixing bracket 261 and the second fixing bracket 262 can be locked onto the outer casing of the head portion using screws.

A lower end of the first fixing bracket 261 is provided with a circular hole M; a lower end of the second fixing bracket 262 is provided with a circular hole N; an upper end of the trolley wheel 22 is provided with a driving lever 221; and the driving lever 221 is capable of being connected to the sliding block 24.

The trolley wheel 22 has a hollow structure, wherein the hollow structure may be inserted with a rod (m-n); the trolley wheel 22 is capable of rolling along the rod (m-n); and the rod (m-n) is capable of matching with the circular holes M and N.

An intermediate portion of the first fixing bracket 261 is provided with a plurality of holes E; a lower end of the second fixing bracket 262 is provided with a plurality of holes C; and the first fixing bracket 261 and the second fixing bracket 261 can be locked to each other using such fasteners as bolts via the holes E and the holes C, such that the sliding block 24 and the trolley wheel 22 are sandwiched between the first fixing bracket 261 and the second fixing bracket 262.

In the electronic device according to this embodiment, the trolley wheel, when rotating, drives the driving lever to move, and the moving driving lever drives the sliding block to slide along the first fixing bracket and the second fixing bracket. The sliding of the sliding block drives the knob of the projector to turn about, to adjust the clarity of the image projected by the projector. In this way, the problem that it is inconvenient to adjust a projector in the related art can be at least addressed, and user experience is improved.

Embodiment 4

An electronic device comprises: a support arm 10, a base portion 30 connected to one end of the support arm 10, and a head portion 20 connected to the other end of the support arm 10. The head portion 20 comprises: a projector 21, which is fixed to the head portion 20 via a projector bracket 23 and is at least configured to make a projection to a first region in a plane where the base portion 30 is disposed; a trolley wheel 22, which is connected to the projector 21 and is configured to adjust an image projected by the projector 21; a sliding block 24, of which one end is connected to a knob extension rod 25 and the other end is connected to the trolley wheel 22, and which is capable of sliding along a fixing bracket 26; and a knob extension rod 25, of which one end is connected to the sliding block 24 and the other end is connected to a knob 211 of the projector 21.

The sliding block 24 is connected to the trolley wheel 22 via a driving lever 221 arranged on an upper end of the trolley wheel 22; and the knob extension rod 25 is connected to the knob of the projector 21 in a sleeve manner.

In an embodiment the fixing bracket 26 comprises a first fixing bracket 261 and a second fixing bracket 262; wherein the first fixing bracket 261 and the second fixing bracket 262 are locked to each other via a first fastener such that the sliding block 24 and the trolley wheel 22 are both sandwiched between the first fixing bracket 261 and the second fixing bracket 262.

FIG. 8(a-f) is a schematic diagram of a position relationship between various parts of the head portion when the trolley wheel rotates according to an embodiment. To be specific, FIG. 8(a) is a front view of a position relationship between the projector, the fixing bracket, the sliding block, and the trolley wheel when the trolley wheel is in a first position. FIG. 8(b) is a side view of the position relationship between the projector, the fixing bracket, the sliding block, and the trolley wheel when the trolley wheel is in the first position. By defining the trolley wheel to be in the first position, it is meant that the driving lever on the trolley wheel forms an acute angle with the central axis of the projector. FIG. 8(c) is a front view of a position relationship between the projector, the fixing bracket, the sliding block, and the trolley wheel when the trolley wheel is in a second position. FIG. 8(d) is a side view of the position relationship between the projector, the fixing bracket, the sliding block, and the trolley wheel when the trolley wheel is in the second position. By defining the trolley wheel to be in the second position, it is meant that the driving lever on the trolley wheel is parallel to the central axis of the projector. FIG. 8(e) is a front view of a position relationship between the projector, the fixing bracket, the sliding block, and the trolley wheel when the trolley wheel is in a third position. FIG. 8(f) is a side view of the position relationship between the projector, the fixing bracket, the sliding block, and the trolley wheel when the trolley wheel is in the third position. When the trolley wheel rotates, the driving lever at the upper portion of the trolley wheel swings as the driving lever rotates; the sliding block slides in the fixing bracket; the sliding of the sliding block drives the knob extension rod to swing, thereby driving the knob of the projector to turn about.

In an electronic device according to the embodiments, the projector is integrated in the head portion of the electronic device, which well protects the projector, and lays a good foundation for selection of the height of the support arm and mounting parts having the other functions in the support arm and the base portion. Further, with the electronic device, a user does not need to be in direct contact with the knob of the projector; through reasonable arrangement of various parts, the sliding block, the trolley wheel, and the fixing bracket and the like are introduced; since the trolley wheel is connected to the projector via the sliding block, the trolley wheel, when rotating, drives the driving lever on the trolley wheel to move, the moving driving lever drives the sliding block to slide along the fixing bracket, and the sliding of the sliding block drives the knob of the projector to turn about, thereby adjusting the clarity of the image projected by the projector. In this way, the problem that it is inconvenient to adjust a projector in the related art can be at least addressed, and user experience is improved.

Embodiment 5

Figure 9:
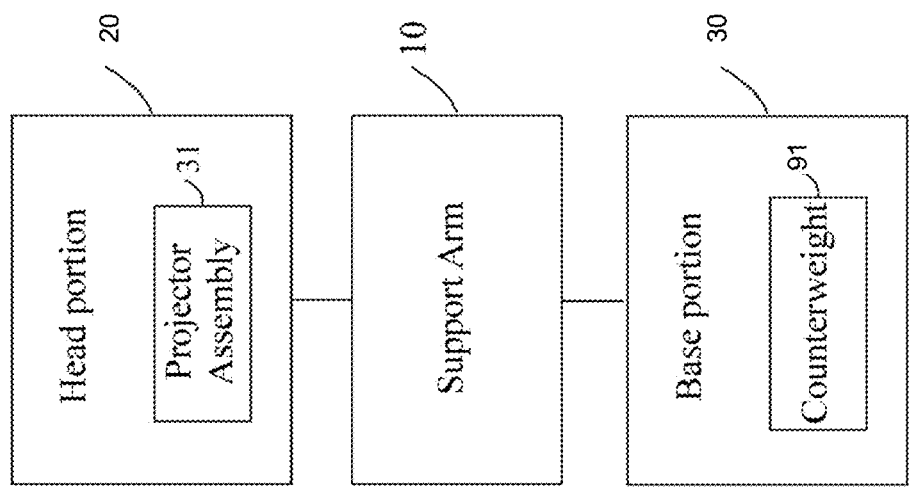
FIG. 9 is a structural schematic diagram of components of an electronic device according to an embodiment.

FIG. 9 is a structural schematic diagram of components of an electronic device according to an embodiment. As shown in FIG. 9, the electronic device comprises: a support arm 10, a base portion 30 connected to one end of the support arm 10, and a head portion 20 connected to the other end of the support arm 10; wherein, the support arm 10 and head portion 20 are both provided therein with accommodation space for parts.

The head portion 20 comprises a projector assembly 31 which can at least project to a first area of a plane on which the base portion 30 is positioned; and the base portion 20 comprises a counterweight 91 which can control a height of a center of gravity of the electronic device below a preset height.

Specifically, the projector assembly 31 is mounted in the accommodation space of the head portion 20 and the counterweight 91 is mounted in the accommodation space of the base portion 30.

Of course, both the size and location of the accommodation space can be designed according to the requirement for the parts to be installed.

For example, the accommodation space in the head portion 20 may be named as the first accommodation space and the accommodation space in the base portion 30 as the second accommodation space. Various parts are connected in linear array in the first accommodation space of the head portion 20; and various parts are connected in linear array in the second accommodation space of the base portion 30. In this way, it is easier for various parts to be mounted in the accommodation space, whereby assembly time can be shortened, and it is also convenient for testing, repairing, and maintenance of the various parts.

Of course, the size and weight of the counterweight 91 may be configured according to actual needs. In this way, the counterweight 91 can make the base portion steadier so as to make the center of gravity of the entire device steadier. Herein, the lower the overall center of the device is, the more likely the electronic device is to remain still instead of being pushed down when under external stress (such as a pulling or pushing force).

As the projector assembly 31 is mounted on the head portion 20, the projector assembly 31 may be kept higher and the projector assembly 31 of a certain height from ground can enjoy a wider range of options in terms of projected areas and ranges. Of course, it is more convenient for the projector assembly 31 to project to the area of the plane on which the base portion 30 is positioned In an embodiment, the housing for the support arm 10, the base portion 20, and the head portion 30 are of an integrated structure.

The housing may be made of an alloy. For example, the alloy can be an aluminum alloy, aluminum magnesium alloy, or the like.

In an embodiment the counterweight 31 may be of stainless steel. In this way, when the electronic device is placed on platforms with high humidity (such as an office floor, classroom podium, or on the ground in an open space), dampening, corrosion, and rust can better prevented, and further physical or chemical changes of the base portion that might influence the overall appearance of the device can be avoided.

Figure 10:
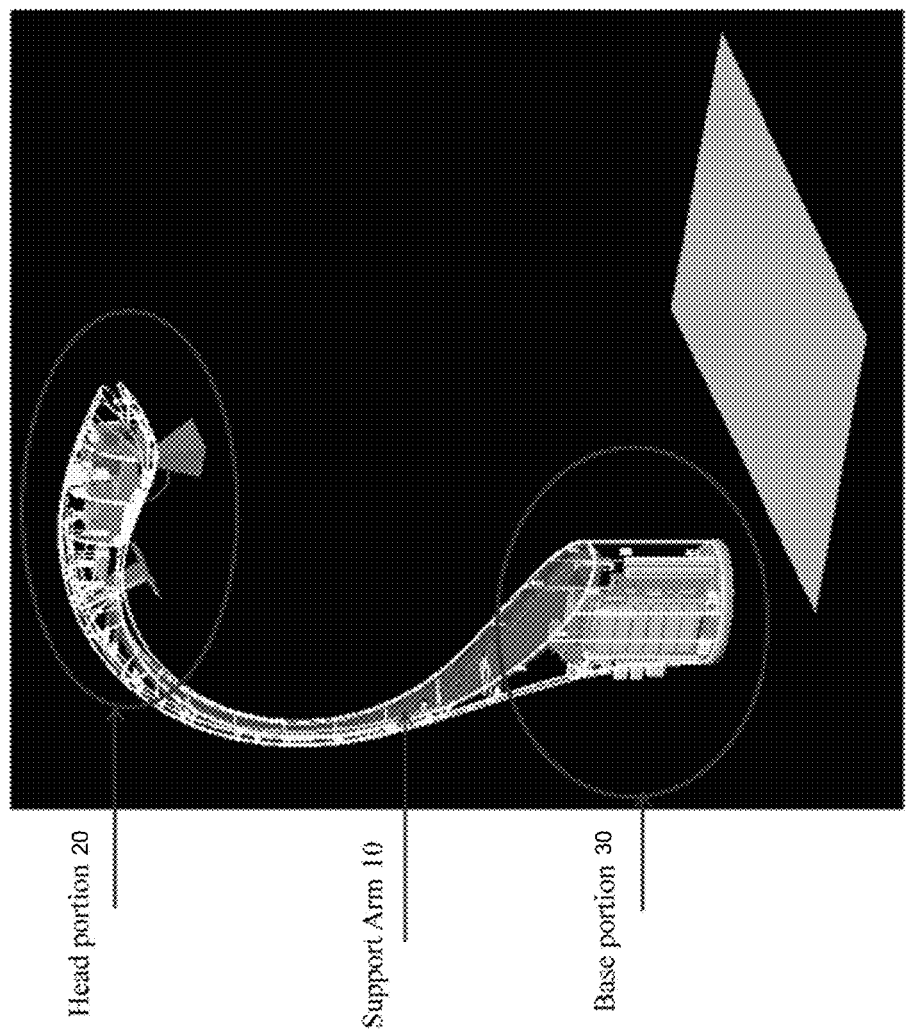
FIG. 10 is an ensemble schematic diagram of components of an electronic device according to an embodiment.

Due to the integrated structure of the housing for the support arm 10, base portion 30, and head portion 20 of the electronic device in the embodiment, the device is easy to move. Moreover, when assembling the device, it is also convenient to mount various parts in the accommodation space which can shorten assembly time. Moreover, the shape of the housing can be more flexibly designed with a wider range of options. For example, the housing may be designed in a moon gate structure, semicircle arc, or scythe shape, etc. FIG. 10 is an ensemble schematic diagram of components of an electronic device according to an embodiment, wherein the shape of the device is a moon gate structure.

Embodiment 6

Figure 11:
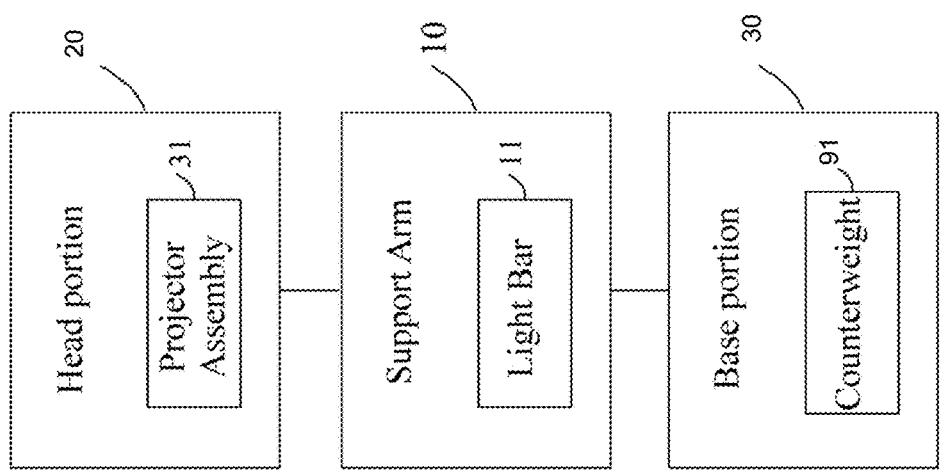
FIG. 11 is a structural schematic diagram of components of another electronic device according to an embodiment.

FIG. 11 is a structural schematic diagram of components of another electronic device according to an embodiment. As shown in FIG. 11, the electronic device comprises: a support arm 10, a base portion 30 connected to one end of the support arm 10, and a head portion 20 connected to the other end of the support arm 10, wherein, the support arm 10 and head portion 20 are both provided therein with accommodation space for parts.

The head portion 20 comprises a projector assembly 31 which can at least project to the first area of the plane on which the base portion 30 is positioned. The base portion 30 comprises a counterweight 91 so that the height of the center of gravity of the electronic device can be below a preset height. The support arm 10 comprises: a controllable light bar 11 which, where the electronic device is under a first mode of utilization, illuminates a first side of the support arm 10 when illuminated.

Herein, the first operation mode may refer to: a case where the projector assembly 31 is in a working mode or a case where the projector assembly 31 is in an inactive mode.

The inner housing for the support arm 10 and/or the head portion 20 is a transparent member so that light can pass through the transparent member when the light bar in the support arm is illuminated. For example, the transparent member is made of acrylic or polycarbonate, etc. In this way, when the projector assembly 31 projects towards the first area of the plane on which the base portion 30 is positioned, the electronic device only functions as a projector when the controllable light bar 11 is off, and the device may function not only as a projector, but also as a table lamp which enhances the projection effect and helps the operator to control the projector assembly 31 when the controllable light bar 11 is on.

In this way, when the projector assembly 31 is in the inactive mode, the controllable light bar 11 may also be turned on so that the electronic device can function as a table lamp with illumination effect. For example, if the electronic device is placed on a classroom podium, and if the teacher's pen falls down to a corner of the podium, the teacher only needs to turn on the controllable light bar on the support arm 10 of the device to look for it.

Figure 12:
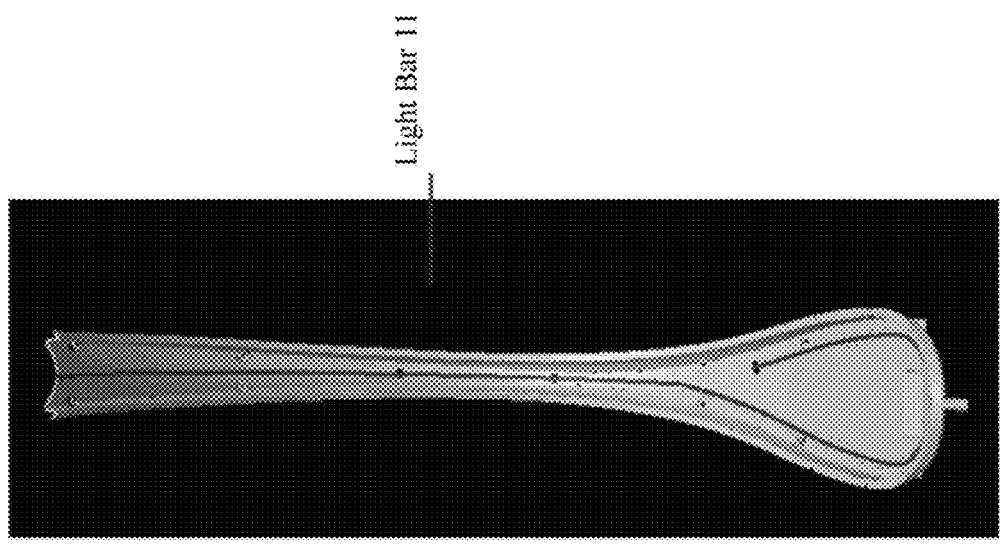
FIG. 12 is a schematic diagram of light bars in the support arm according to an embodiment.

FIG. 12 is a schematic diagram of light bar 11 on the support arm 10 according to an embodiment of the present invention. As in FIG. 12, the light bar 11 is located on the entire support arm 10. In this way, when the light bar 11 is turned on, the entire support arm 10 can emit light of the light bar to the outside.

For the electronic device stated in the embodiment, as the support arm 10 is provided therein with a controllable light bar 11, the device can both function as a table lamp and a projector, which makes it more convenient for the operator to control the projector assembly and can improve user experience.

Embodiment 7

Figure 13:
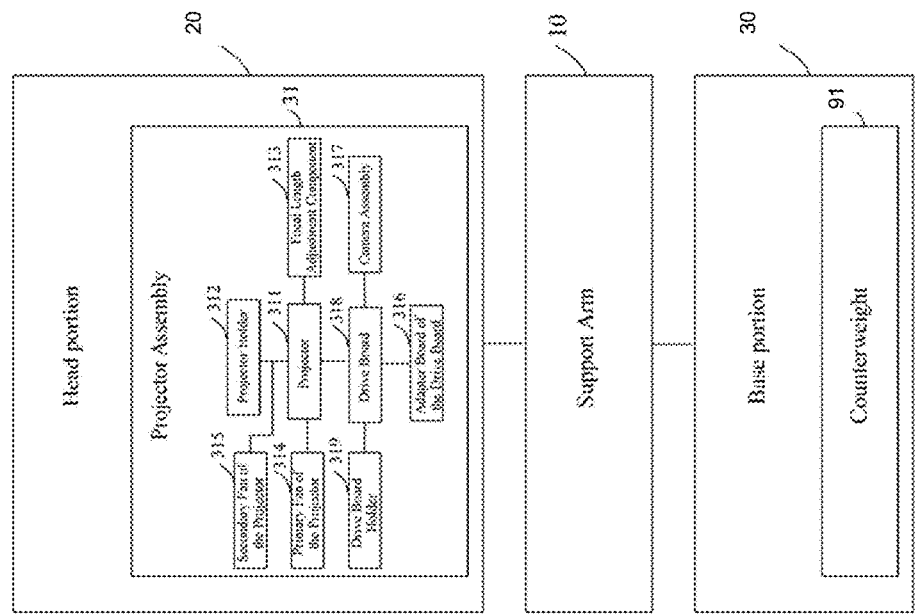
FIG. 13 is a structural schematic diagram of components of another electronic device according to an embodiment.

FIG. 13 is a structural schematic diagram of components of another electronic device according to an embodiment. As shown in FIG. 13, the electronic device comprises: a support arm 10, a base portion 30 connected to one end of the support arm 10, and a head portion 20 connected to the other end of the support arm 10, wherein, the support arm 10 and head portion 20 are both provided therein with accommodation space for parts.

The head portion 20 comprises a projector assembly 31 which can at least project to the first area of the plane on which the base portion 30 is positioned. The base portion 20 comprises a counterweight 91 which can control the height of the center of gravity of the electronic device below the preset height.

Specifically, the projector assembly 31 is mounted in the accommodation space of the head portion 20 and the counterweight 91 is mounted in the accommodation space of the base portion 30.

Of course, both the size and location of the accommodation space can be designed according to the requirement for the parts to be installed.

The projector assembly 31 comprises a projector 311, a projector holder 312, and a focal length adjustment component 313; wherein, the projector holder 312 is fixed on the first housing of the head portion and the projector 311 is mounted on the projector holder 312 for projecting images. The focal length adjustment component 313 is used for adjusting the images projected by projector 311.

Herein, the adjustment knobs of the focal length adjustment component 313 and the camera lens of projector 311 are both exposed outside the inner housing of the head portion. In this way, the projector 311 may project towards the plane on which the base portion 30 is positioned. It is also convenient for the operator to reach for the knob of the focal length adjustment component 313, and furthermore, operation of the knob by the user to adjust the images projected by projector 311 is facilitated.

The projector assembly further comprises: a primary projector fan 314 located on one side of the projector 311 and adjacent to the drive board 318 for projector 311 cooling; and a secondary projector fan 315 of located right above the projector 311 for increasing air flow for the projector 311.

The head portion 20 further comprises: a pluggable camera assembly 317 for collecting operation data and sending the operation data collected to the mainboard of the base portion 30. A drive board 318 connected to the projector 311; the drive board 318 being mounted on the drive board holder 319 fixed on the first housing of the head portion 20. An adapter board 316 of the drive board 218 for connecting the drive board 318 and the mainboard located on the base portion 30.

Specifically, the drive board 318 can also be used for transmitting the images collected by camera assembly 317 to the mainboard on the base portion 30.

Figure 14:
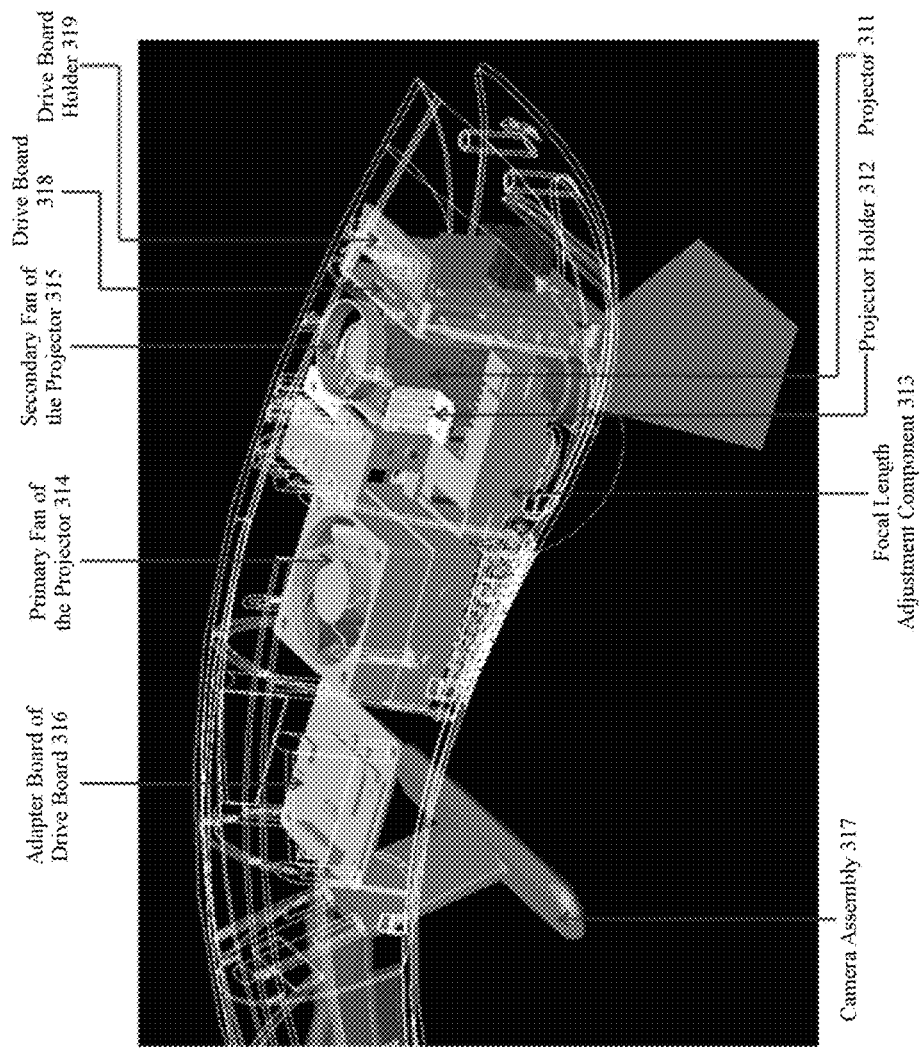
FIG. 14 is a layout plan of various parts of the head portion according to an embodiment.

FIG. 14 is a layout plan of various parts of the head portion according to an embodiment. As shown in FIG. 14, the projector holder 312 is fixed on the first housing of the head portion, the projector 311 is mounted on the projector holder 312, and the focal length adjustment component 313 is connected to the projector 311. The primary fan 314 of the projector is located on one side of projector 311 and adjacent to the drive board 318. The secondary fan 315 of the projector is located right above the projector 311. The drive board holder 319 is fixed on the first housing of the head portion. The drive board 318 is arranged on the drive board holder 319 and connected to the projector 311. The adapter board 316 of drive board is connected to the drive board 318 and the mainboard on the base portion, and the left side of the adapter board 316 of drive board is provided therein with the pluggable camera assembly 317.

A person skilled in the art should understand that the connection type between various parts comprises physical connection, electrical connection, and harness connection, which will not be elaborated herein. For the electrical device described in this embodiment, relevant parts that may realize projection functions are integrated on the head portion with reasonable structural layout, and the adjustment knobs of the focal length adjustment component 313 and the camera lens of the projector 311 are both exposed outside the inner housing of the head portion. In this way, when the device functions as a projector, the projector 311 may project towards the plane on which the base portion is positioned, and it is also convenient for the operator to reach for the adjustment knob of the focal length adjustment component 313, and furthermore, operation of the knob by the user to adjust the images projected by projector 311 is facilitated.

Embodiment 8

Figure 15:
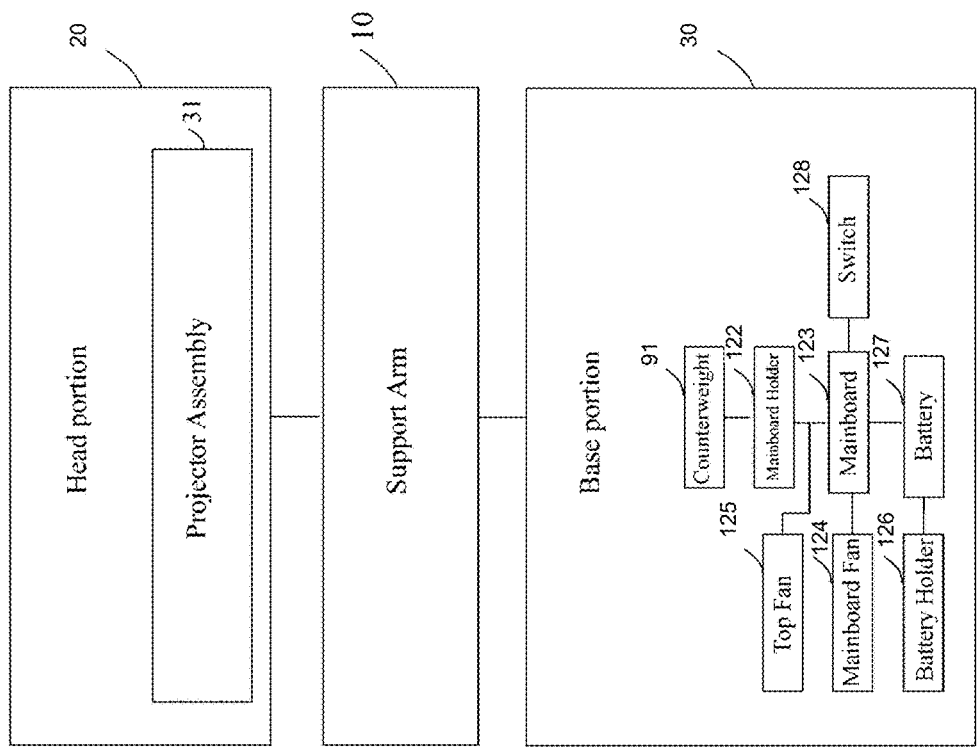
FIG. 15 is a structural schematic diagram of components of another electronic device according to an embodiment.

FIG. 15 is a structural schematic diagram of components of an electronic device according to an embodiment. As shown in FIG. 15, the electronic device comprises: a support arm 10, a base portion 30 connected to one end of the support arm 10, and a head portion 20 connected to the other end of the support arm 10, wherein, the support arm 10 and head portion 20 are both provided therein with accommodation space for parts. The head portion 20 comprises a projector assembly 31 which can at least project to the first area of the plane on which the base portion 30 is positioned; and the base portion 30 comprises a counterweight 91 which can control the height of the center of gravity of the electronic device below the preset height.

Specifically, the projector assembly 31 is mounted in the accommodation space of the head portion 20 and the counterweight 91 is mounted in the accommodation space of the base portion 30. Of course, both the size and location of the accommodation space can be designed according to the requirements of the parts to be installed.

The base portion 30 further comprises: a mainboard holder 122 fixed on the second housing of the base portion 30; a mainboard 123 mounted on the mainboard holder 122 and connected to the drive board 318 on the head portion 20 through the adapter board 316 of the drive board on the head portion 20.

The mainboard 123 is used for: providing projection control for the electronic device based on operation data collected by the camera assembly 317.

The mainboard 123 is used for: providing a computer function for the electronic device and projecting the first information in the computer to the first area on the plane of the base portion 30 via the projector 311 and displaying the first information on the first area. That is, by integrating computer chips in the base portion 30, the base portion 30 is thus able to function as a computer, and by employing the projector as a monitor, the information in the computer may be projected to the plane on which the base portion 30 is positioned via the projector.

Based on the electronic device described in embodiment 7, wherein, the head portion is integrated with relevant parts that can realize projection and provided therein with a pluggable camera assembly 317, the camera assembly 317 is also used for: collecting user's operation data on the operation interface displayed on the first area, wherein, the operation data comprises collected images. The operation data are output to the mainboard 123 on the base portion 30; correspondingly, the mainboard 123 is also used for analyzing the operation data and responding to the operations displayed on the operation interface in the first area according to the results of analysis.

The base portion 30 further comprises: a mainboard fan 124 located on one side of the mainboard 123 for mainboard 123 cooling; and a top fan 125 located on the top of the mainboard 123 for increasing air flow for the mainboard 123.

The base portion 30 further comprises: a battery holder 126 fixed on the second housing of the base portion 30; a battery 127 mounted on battery holder 126 on the other side of the mainboard 123 for power storage or supply; and a switch 128 connected to the mainboard 123, the first part of the switch 128 being located on the exterior of the second housing for turning on and off the electronic device.

Specifically, the switch 128 may be applied to turn on and off the computer of the base portion 30 and/or the projector 311 of the head portion 20 and/or the light bars 11 of the support arm 10.

The support arm 10 comprises a controllable light bar 11 which can illuminate a first side of the support arm 10 when illuminated.

Light bar 11 may be turned on for illumination, when the projector assembly 31 is in work mode or inactive mode, the electronic device is in illumination mode, or the device is only used as a computer.

Figure 16:
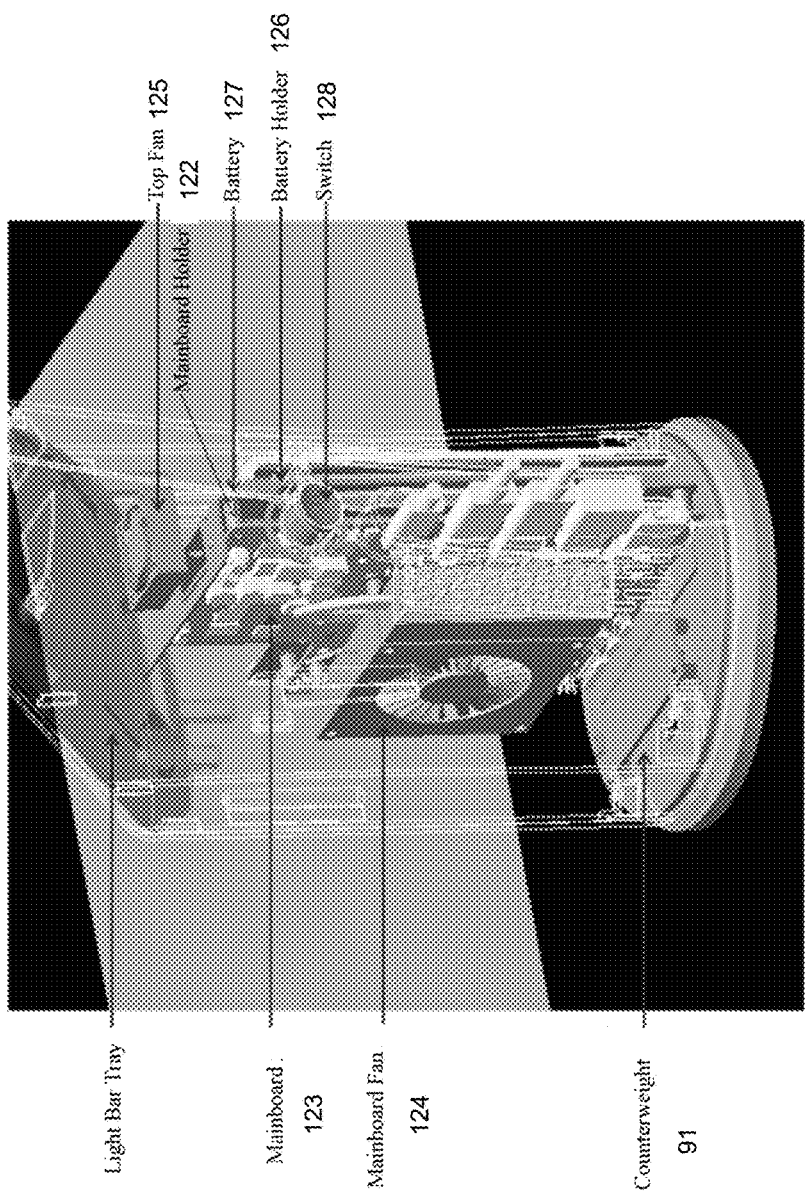
FIG. 16 is a layout plan of various parts of the base portion according to an embodiment.

FIG. 16 is a layout plan of various parts of the base portion according to an embodiment. In FIG. 16, the counterweight 91 is located below the base portion; the mainboard holder 122 and battery holder 126 are both fixed on the second housing of the base portion; the mainboard 123 is mounted on the mainboard holder 122; the battery 127 is mounted on the battery holder 126; the mainboard fan 124 is located on one side of the mainboard 23; the top fan 125 is located above the mainboard 123; and the switch 128 is connected to the mainboard 123. Specifically, a person skilled in the art should understand that the connection type between various parts comprises physical connection, electrical connection, and harness connection, which will not be elaborated herein.

The electronic device described in this embodiment, as mainboard chips are integrated in the base portion, can not only provide projection functions for the device based on operation data collected by the camera assembly 317, but also functions separately as a computer, which largely enhances user experience.

Embodiment 9

In an embodiment, an electronic device, comprises: a support arm 10, a base portion 30 connected to one end of the support arm 10, and a head portion 20 connected to the other end of the support arm 10, wherein, the support arm 10 and head portion 20 are both provided therein with accommodation space for parts.

The head portion 20 comprises a projector assembly 31 which can at least project to the first area of the plane on which the base portion 30 is positioned.

The base portion 30 comprises a counterweight 91 so that the height of the center of gravity of the electronic device can be below a preset height; and the support arm 10 comprises: a controllable light bar 11 which, when illuminated, can illuminate a first side of the support arm 10.

Herein, the first operation mode may refer to a case where the projector assembly 31 is in work mode or a case where the projector assembly 31 is in the inactive mode.

The inner housing for the support arm 10 and/or the head portion 20 is a transparent member so that light can pass through the transparent member when the light bar in the support arm is illuminated. For example, the transparent member is made of acrylic or polycarbonate, etc.

Figure 17:
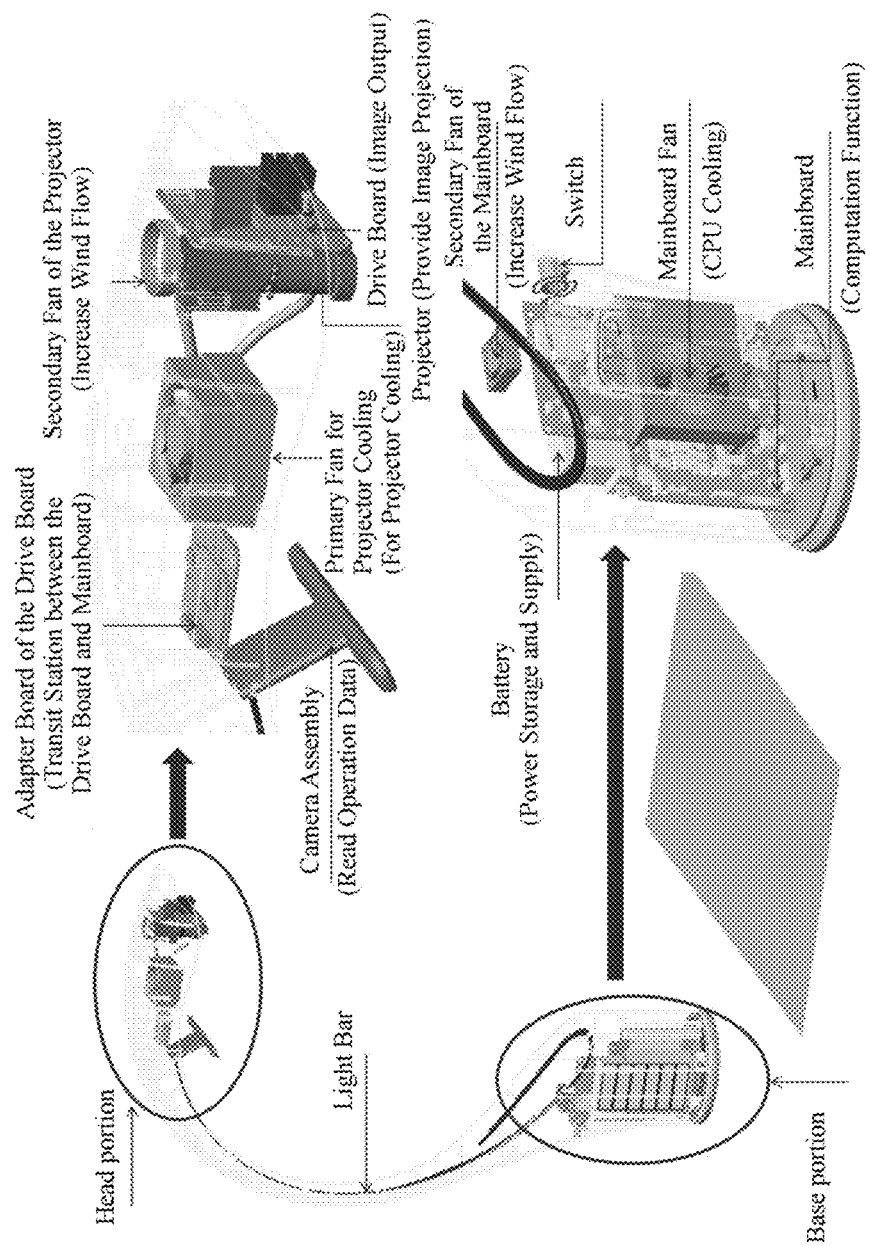
FIG. 17 is a schematic diagram of internal and external main parts of an electronic device according to an embodiment.

FIG. 17 is a schematic diagram of internal and external main components of an electronic device according to an embodiment, wherein the main body housing comprises an integrated structure with a shape of moon gate of aluminum magnesium alloy or aluminum. The focal length adjustment component is made of aluminum alloy, and the external of the camera assembly is also made of aluminum alloy material. The battery is fixed on the battery holder; the counterweight is made of stainless steel and the main cover plate is made of galvanized steel sheet. The projector holder is also made of galvanized steel sheet. The drive board holder is made of aluminum alloy or galvanized steel sheet. The lamp holder for light bar on the support arm is made of aluminum alloy or aluminum magnesium alloy. The transparent member is made of polycarbonate (PC for short) or acrylic. The mainboard is made of galvanized steel sheet.

Specifically, FIG. 17 only indicatively provides a schematic diagram of the internal and external main parts of the electronic device. Of course, with the change of housing appearance and structure, various internal parts may have other types of assembly, which will not be further listed here.

Figure 18:
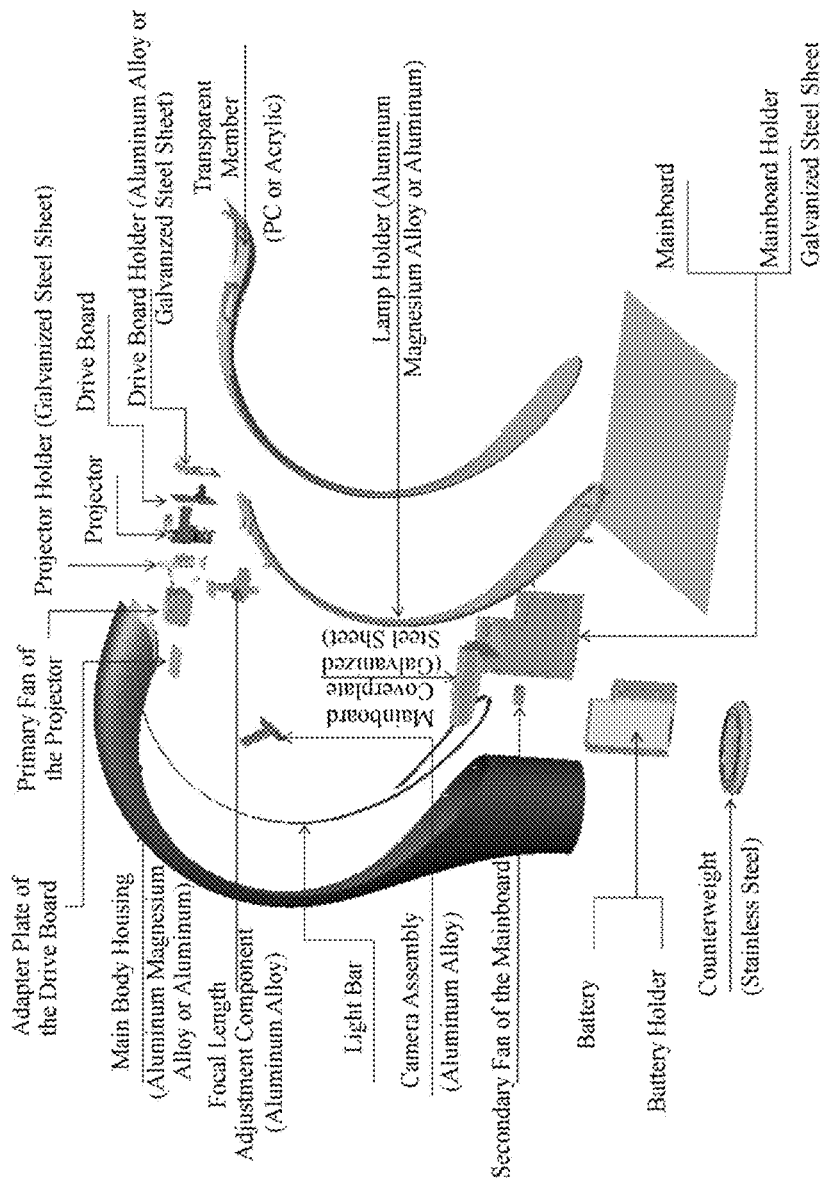
FIG. 18 is a relationship schematic diagram of internal main parts of an electronic device according to an embodiment.

FIG. 18 is a relationship schematic diagram of internal main components of an electronic device according to an embodiment, wherein the electronic device comprises a head portion, a support arm and a base portion; furthermore, there is a light bar on the support arm. Specifically, in the enlarged schematic diagram of the head portion, the head portion mainly comprises: a camera assembly for reading operation data; an adapter board of the drive board, wherein, the adapter board of the drive board functions as a transit station between the drive board and mainboard; a primary cooling fan for projector cooling; a secondary fan for increasing wind flow for projector; a projector that provides image projections; and a drive board for image output. Specifically, in the enlarged schematic diagram of the base portion, the base portion mainly comprises: a mainboard for computation; a primary fan of mainboard for cooling; a secondary fan of mainboard for increasing wind flow; a switch; a battery for power storage or supply.

Specifically, FIG. 18 only indicatively provides a relationship schematic diagram of main parts in the electronic device. Of course, there might be multiple relational modes based on the principles of the present invention, which will not be further listed herein.

It shall be understood that the devices and methods disclosed in the embodiments of the application may be implemented in other ways. The device embodiments as described above are only for illustrative purposes. Specifically, the definition of units described herein is only a logical definition, and other definition methods can be employed in practical application. For example, multiple units or components may be combined, or integrated into another system, or some features may be omitted or not implemented. Additionally, coupling, direct coupling, or communication connections among the components as shown or discussed may be implemented through some interface(s), and indirect coupling or communication connections of devices or units may be in an electrical, mechanical, or other form.

The units described above as separate components may or may not be separated physically. The components illustrated as units may or may not be physical units, i.e., they can be located in one place or can be distributed to multiple network units. The functions of the embodiments can be achieved by some or all of the units, according to actual requirements.

Moreover, various functional units of various embodiments in the invention can all be integrated in one processing unit, or each unit may function as a single unit, or two or more units may be integrated in one unit; the integrated units may be realized by hardware, or by a functional unit with hardware and software.

A person skilled in the art should understand that all or certain steps to realize the embodiments of the methods may be accomplished by relevant hardware via program commands. The program may be stored in a readable, non-transitory storage media of a computer, where a non-transitory media includes all media other than signal media. When the program runs, the steps of the embodiments of the methods can be implemented. The storage media comprises mobile storage devices, read-only memories (ROM), random access memories (RAM), diskettes or disks, and other various types of media of program code storage.

Alternatively, if the integrated units described in the invention are realized by functional modules of software and sold or used as independent products, they may be stored in a readable, non-transitory storage media of a computer. Based on such understanding, the technical aspects of the embodiments can essentially be, or the parts that contribute to the current technology can be, embodied in the form of software products. Software products of the computer are stored in one non-transitory storage media, including numerous commands to make one computer device (likely, a computer, server, or network device, etc.) implement all or part of the methods described in each embodiment. The non-transitory storage media comprises mobile storage devices, read-only memories (ROM), random access memories (RAM), diskettes or disks, and other various types of media of program code storage.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An electronic device, comprising:
    a support arm;
    a base portion connected to one end of the support arm; and
    a head portion connected to the other end of the support arm, wherein the head portion comprises:
        a projector fixed to the head portion via a projector bracket and that makes a projection to a first region in a plane where the base portion is disposed; and
        a trolley wheel connected to the projector that adjusts an image projected by the projector;
        a sliding block connected to the trolley wheel, said sliding block sliding along a fixing bracket; and
        a knob extension rod connected to the sliding block and a knob of the projector;
        wherein the trolley wheel is connected to the projector via the sliding block;
    wherein a first portion of the trolley wheel is exposed on a first outer surface of an outer casing of the head portion.

2. The electronic device according to claim 1, wherein the sliding block is connected to the trolley wheel via a driving lever arranged on an upper end of the trolley wheel; and the knob extension rod is connected to the knob of the projector in a sleeve manner.

3. The electronic device according to claim 2, wherein the fixing bracket comprises a first fixing bracket and a second fixing bracket; wherein the first fixing bracket and the second fixing bracket are locked to each other via a first fastener such that the sliding block and the trolley wheel are both sandwiched between the first fixing bracket and the second fixing bracket.

4. The electronic device according to claim 3, wherein:
    the first fixing bracket and the second fixing bracket are each provided with a first mating member;
    the sliding block is provided with two second mating members matching with the first mating members; and
    when the sliding block slides, the two second mating members move along the first mating members arranged on the first fixing bracket and the second fixing bracket.

5. The electronic device according to claim 4, wherein, when rotating, the trolley wheel drives the driving lever to move, the driving lever drives the sliding block to slide along the first fixing bracket and the second fixing bracket, and the sliding of the sliding block drives the knob of the projector to thus adjust clarity of the image projected by the projector.

6. The electronic device according to claim 1, wherein a first portion of a lens of the projector is exposed on the first outer surface of the outer casing of the head portion such that the projector makes a projection towards the plane where the base portion is disposed.

7. The electronic device according to claim 6, wherein, on the first outer surface of the outer casing of the head portion, the first portion of the lens of the projector is adjacent to the first portion of the trolley wheel, with a spacing between the first portion of the lens and the first portion of the trolley wheel being less than a preset threshold.

8. The electronic device according to claim 7, wherein an outer casing of the electronic device comprises a moon-like door shape.

9. An electronic device, comprising:
    a support arm, wherein the support arm comprises a controllable light bar;
    a base portion connected to one end of the support arm; and
    a head portion connected to the other end of the support arm;
    wherein:
        the base portion and the head portion are both provided therein with accommodation space for parts;
        the head portion comprises a projector assembly that at least projects to a first area of a plane on which the base portion is positioned; and
        the base portion comprises a counterweight so that a height of a center of the gravity of the electronic device is lower than a preset height.

10. The electronic device according to claim 9, wherein the projector assembly comprises a projector, a projector holder, and a focal length adjustment component; wherein:
    the projector holder is fixed on a first housing of the head portion and the projector is mounted on the projector holder, said projector projecting images; and
    the focal length adjustment component adjusts the images projected.

11. The electronic device according to claim 9, wherein the head portion further comprises:
    a camera assembly for collecting operation data and sending the operation data collected to the base portion.

12. The electronic device according to claim 11, wherein the base portion comprises:
    a projection control for the electronic device, wherein the base portion controls projection based on operation data collected by the camera assembly.

13. The electronic device according to claim 12, wherein the base portion comprises:
    a board that provides a computer function that projects a first information to a first area on a plane of the base portion via the projector and display the first information on the first area.

14. The electronic device according to claim 9, wherein the housing for the support arm, the base portion and the head portion is an integrated structure.

15. The electronic device according to claim 9, wherein a housing for one of the support arm and the head portion is transparent so that light can pass through the housing when the light bar in the support arm is illuminated.

16. The electronic device according to claim 15, wherein the housing comprises a material selected from the group consisting of an acrylic or a polycarbonate.

17. An electronic device, comprising:
    a support arm, wherein the support arm comprises a controllable light bar;
    a base portion connected to one end of the support arm;

a head portion connected to the other end of the support arm;

a projector disposed within the head portion; and a projector adjustment element that adjusts an image projected by the projector;

wherein a portion of the projector adjustment element is exposed on an underside of the head portion.

18. The electronic device of claim 17, wherein the base portion comprises a counterweight that lowers a center of the gravity of the electronic device, wherein an element selected from the group of the support arm and the head portion comprises a light bar, and further wherein the support arm is curved.

\* \* \* \* \*